United States Patent
Lee et al.

(10) Patent No.: US 8,411,612 B2
(45) Date of Patent: Apr. 2, 2013

(54) METHODS OF PERFORMING COOPERATIVE COMMUNICATION IN WIRELESS LANS

(75) Inventors: Tae-Jin Lee, Suwon-si (KR); Chang-Yeong Oh, Suwon-si (KR)

(73) Assignee: Sungkyunkwan University Foundation for Corporation Collaboration, Gyeonggi-Do (KR)

( * ) Notice: Subject to any disclaimer, the term of this patent is extended or adjusted under 35 U.S.C. 154(b) by 479 days.

(21) Appl. No.: 12/642,046

(22) Filed: Dec. 18, 2009

(65) Prior Publication Data

US 2011/0032864 A1 Feb. 10, 2011

(30) Foreign Application Priority Data

Aug. 10, 2009 (KR) .................. 10-2009-0073147

(51) Int. Cl.
*H04B 7/14* (2006.01)
(52) U.S. Cl. .................. 370/315; 370/328; 455/434
(58) Field of Classification Search .................. 370/315, 370/328; 455/434
See application file for complete search history.

(56) References Cited

U.S. PATENT DOCUMENTS

| | | | |
|---|---|---|---|
| 2008/0137585 A1* | 6/2008 | Loyola et al. | 370/315 |
| 2008/0310348 A1* | 12/2008 | Nandagopalan et al. | 370/328 |
| 2010/0020739 A1* | 1/2010 | Chou et al. | 370/315 |
| 2010/0189047 A1* | 7/2010 | Baum et al. | 370/329 |

OTHER PUBLICATIONS

Chang-Yeong Oh et al: "MAC Protocol Using Cooperative Active Relays in Multi-rate Wireless LANs" Supported by the Korea Research Foundation Grant funded by the Korean Government; 2009.

* cited by examiner

*Primary Examiner* — Pao Sinkantarakorn
*Assistant Examiner* — Richard K Chang
(74) *Attorney, Agent, or Firm* — Harness, Dickey & Pierce, P.L.C.

(57) ABSTRACT

Method of performing cooperative communication in wireless LAN includes determining, by receiver, whether cooperative communication is necessary based on transmission request signal provided from transmitter, when it is determined that the cooperative communication is necessary, transmitting, by the receiver, transmission response signal instructing the cooperative communication, overhearing, by a plurality of devices, the transmission response signal instructing the cooperative communication, transmitting, by at least one of the devices, response signal for supporting relaying to the transmitter, selecting, by the transmitter, a relay based on the response signal, transmitting, by the transmitter, data to the relay, and attaching, by the relay, data of the relay to the data transmitted by the transmitter and transmitting result data to the receiver. Thus, average transmission rate of wireless LAN can be improved with minimized overhead, and additional transmission opportunity can be provided to relaying device, thereby properly rewarding relaying device.

16 Claims, 11 Drawing Sheets

FIG. 9

| Parameter | Value | Parameter | Value |
|---|---|---|---|
| MAC header+FCS | 272 bits | CWriCTS | 8 slots |
| PHY header | 192 bits | slot time | 20μs |
| RTS | 352 bits | SIFS | 10μs |
| CTS | 304 bits | DIFS | 50μs |
| ACK | 320 bits | retry limits | 6 |
| cCTS | 304 bits | MSDU size | 2304 bytes (with Fragmentation) |
| riCTS | 320 bits | | 2304/2 bytes (without fragmentation) |
| CWmin | 32 slots | DIFS: DCF(Distributed Coordination Function) Interframe Space SIFS: Short Interframe Space FCS: Frame Check Sequence CW: Contention Window size | |
| CWMax | 1024 slots | | |

METHODS OF PERFORMING COOPERATIVE COMMUNICATION IN WIRELESS LANS

CLAIM FOR PRIORITY

This application claims the benefit under 35 U.S.C. §119(a) of Korean Patent Application No. 10-2009-0073147, filed on Aug. 10, 2009, the disclosure of which is incorporated herein in its own entirety by reference.

BACKGROUND

1. Technical Field

Example embodiments of the present invention relate to methods of performing communication in a wireless local area network (LAN), and more particularly, to methods of performing cooperative communication in a wireless LAN that is capable of improving the throughput of the wireless LAN.

2. Related Art

Wireless LANs such as IEEE 802.11a/b/g-based wireless LANs can support multiple transmission rates depending on channel conditions. For example, the IEEE 802.11b-based wireless LAN can support four transmission rates: 1, 2, 5.5, and 11 Mbps.

One problem of wireless LANs supporting multiple transmission rates is low average throughput of the overall network in view of a maximum transmission rate that can be supported by the networks. In particular, the average throughput of the overall network is considerably reduced according to a number of low-rate terminals within the transmission coverage of an access point (AP), in spite of presence of high-rate terminals. The degradation of the average throughput of the network, which may be a common problem of IEEE 802.11-based wireless LAN series supporting multiple transmission rates, results from a carrier sense multiple access with collision avoidance (CSMA/CA) scheme that was adopted as a basic medium access scheme by the IEEE 802.11 series.

CSMA/CA provides fair transmission opportunity to all terminals through a binary exponential backoff algorithm. CSMA/CA is an excellent medium access scheme because CSMA/CA provides fair transmission opportunity to all terminals, but has a characteristic that the throughput of the overall network is affected by low-rate terminals because the low-rate terminals have a longer channel occupying time than high-rate terminals.

FIG. 1 illustrates an operational process of legacy IEEE 802.11 MAC protocol. Referring to FIG. 1, a transmitter (station 1 or a first source) obtains transmission opportunity after backoff contention subsequent to a distributed coordination function InterFrame space (DIFS) through a binary exponential backoff algorithm-based CSMA/CA, and then transmits a request to send (RTS) frame to a receiver (a destination or an AP) to reserve a medium.

Upon successful receipt of the RTS frame, the receiver responds with a clear to send (CTS) frame after a short Inter-Frame space (SIFS) to request the transmitter to transmit data. In response to the CTS frame, the transmitter transmits the data to the receiver through the medium, and upon successful receipt of the data, the receiver transmits an ACK frame to the transmitter.

Then, another transmitter (a second source) transmits data to the receiver (a destination or an AP) through the same process as described above.

As shown in FIG. 1, as the legacy IEEE 802.11-based MAC protocol has the characteristic of CSMA/CA that fair transmission opportunity is provided to all terminals, all the terminals have the same channel access probability. A low-rate terminal successfully accessing the channel has a longer channel occupying time than a high-rate terminal. As terminals accessing the channel increase, the overall throughput of the network decreases.

A method of setting a different size of an initial contention window according to a transmission rate (different initial contention window size adaptation; DICWA), and a method of limiting a maximum data size that can be transmitted in a unit time frame according to a transmission rate (different MAC service data unit size adaptation; DMA) have been proposed to solve the problem described above. Recently, effective combinations of the two methods have been studied.

Also, a method of increasing overall throughput of a network through cooperative communication as a next-generation communication scheme has recently been studied. Among methods of improving average throughput of a network through cooperative communication in a wireless LAN, a method of embodying cooperative communication through cooperation between terminals has been proposed. In this method, a high-rate terminal relays data from a low-rate terminal to an AP.

However, overhead may additionally occur when performing communication through cooperation between terminals in a wireless LAN. Since the overhead may degrade overall throughput, it is necessary to provide a method of minimizing the overhead. Also, since terminals in a wireless LAN are privately owned, terminals participating in relaying to increase a transmission rate for other users through cooperation between the terminals must be properly rewarded.

SUMMARY

Accordingly, example embodiments of the present invention are provided to substantially obviate one or more problems due to limitations and disadvantages of the related art.

Example embodiments of the present invention provide a method of performing cooperative communication in a wireless LAN that is capable of properly rewarding a relaying device and improving an average transmission rate of the wireless LAN while minimizing overhead resulting from cooperative communication.

In some example embodiments, a method of performing cooperative communication in a wireless local area network (LAN) includes receiving a transmission request signal; determining whether cooperative communication is necessary based on the received transmission request signal; and when it is determined that the cooperative communication is necessary, transmitting a transmission response signal instructing the cooperative communication. The determining of whether cooperative communication is necessary may include reading the newest transmission rate information of a transmitter transmitting the transmission request signal; determining whether the transmitter performs transmission at a maximum transmission rate based on the read transmission rate information; and when it is determined that the transmitter does not perform transmission at a maximum transmission rate, determining whether the cooperative communication is necessary. The method may further include: when it is determined that the transmitter performs transmission at a maximum transmission rate, determining that the cooperative communication is unnecessary and transmitting a transmission response signal instructing direct communication. The transmission response signal instructing the cooperative communication may include a field including a value instructing the cooperative communication. The method may further include overhearing, by at least one device, the transmission response signal instructing the cooperative communication; and transmitting, by the at least one device, a response signal for supporting relaying to the transmitter. The response signal for supporting relaying may include first transmission rate information that is transmission rate information between the transmitter and the at least one device, and second transmission rate information that is transmission rate information between the at least one device and a receiver transmitting the transmission response signal instructing cooperative communication. The method may further include selecting, by the transmitter, a relay from the at least one device based on the response signal for supporting relaying received from the at least one device; and transmitting, by the transmitter, data to the selected relay. The selecting of the relay may include selecting, as the relay, a device with the highest second transmission rate information among the second transmission rate information included in the response signal for supporting relaying. The selecting of the relay may include: when there are two or more devices with the highest second transmission rate information, selecting a device with the highest first transmission rate among the two or more devices, as the relay. The method may further include receiving, by the selected relay, the data from the transmitter; and attaching, by the relay, data of the relay to the data received from the transmitter and transmitting resultant data to the receiver. The transmitting of the resultant data to the receiver may include transmitting, by the relay, the data received from the transmitter and the data of the relay to the receiver through fragmentation within a prescribed number. The transmitting of the data to the selected relay may include selecting, by the transmitter, a maximum backoff value in a prescribed contention window for data transmission; and when the selected maximum backoff value is 0, transmitting the data.

In other example embodiments, a method of performing data transmission in a wireless LAN includes transmitting a transmission request signal to a receiver to request data transmission; receiving a transmission response signal instructing cooperative communication as a response to the transmission request signal; receiving a response signal for supporting relaying from at least one candidate relay; selecting a relay based on the response signal for supporting relaying; and transmitting data to the selected relay. The transmitting of the data to the selected relay may include selecting a maximum backoff value in a prescribed contention window for data transmission; and when the selected maximum backoff value is 0, transmitting the data.

In still other example embodiments, a method of performing cooperative communication in a wireless LAN includes overhearing, by a first device, a transmission response signal instructing cooperative communication; selecting, by the first device, a backoff value for transmitting a response signal for supporting relaying; and transmitting only once, by the first device, the response signal for supporting relaying based on the selected backoff value. The response signal for supporting relaying may include first transmission rate information that is transmission rate information between a transmitter and the first device, and second transmission rate information that is transmission rate information between the first device and a receiver. The method may further include: overhearing, by a second device, the response signal for supporting relaying that is transmitted by the first device; comparing, by the second device, the second transmission rate information of the first device with the second transmission rate information of the second device; and when the second transmission rate of the second device is lower than the second transmission rate of the first device, not transmitting a response signal for supporting relaying. The method may further include receiving, by the first device, first data from a transmitter; attaching, by the first device, second data of the first device to the first data; and transmitting, by the first device, the first data and the second data to a receiver. The transmitting of the first data and the second data to the receiver may include transmitting, by the first device, the first data and the second data to the receiver through fragmentation within a prescribed number. The transmitting of the first data and the second data to the receiver may include transmitting, by the first device, the first data and the second data to the receiver through fragmentation within a prescribed range of data amount.

In yet other example embodiments, a method of performing cooperative communication in a wireless LAN includes determining, by a receiver, whether cooperative communication is necessary based on a transmission request signal provided from a transmitter; when it is determined that the cooperative communication is necessary, transmitting, by the receiver, a transmission response signal instructing the cooperative communication; overhearing, by a plurality of devices, the transmission response signal instructing the cooperative communication; transmitting, by at least one of the plurality of devices, a response signal for supporting relaying to the transmitter; selecting, by the transmitter, a relay based on the response signal; transmitting, by the transmitter, data to the relay; and attaching, by the relay, data of the relay to the data transmitted by the transmitter and transmitting result data to the receiver.

BRIEF DESCRIPTION OF DRAWINGS

Example embodiments of the present invention will become more apparent by describing in detail example embodiments of the present invention with reference to the accompanying drawings, in which:

FIG. 9 illustrates dominant parameter values used to evaluate the performance of the method of performing cooperative communication in a wireless LAN according to an example embodiment of the present invention;

DESCRIPTION OF EXAMPLE EMBODIMENTS OF THE PRESENT INVENTION

Figure 1:
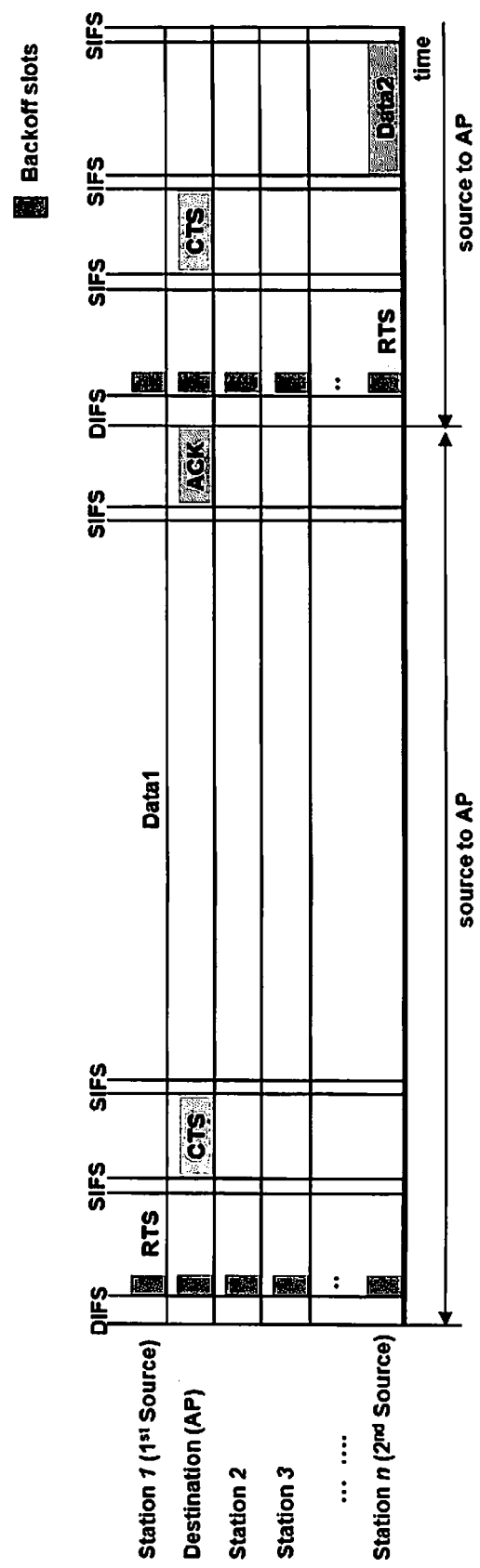
FIG. 1 illustrates an operational process of legacy IEEE 802.11 MAC protocol.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Figure 2:
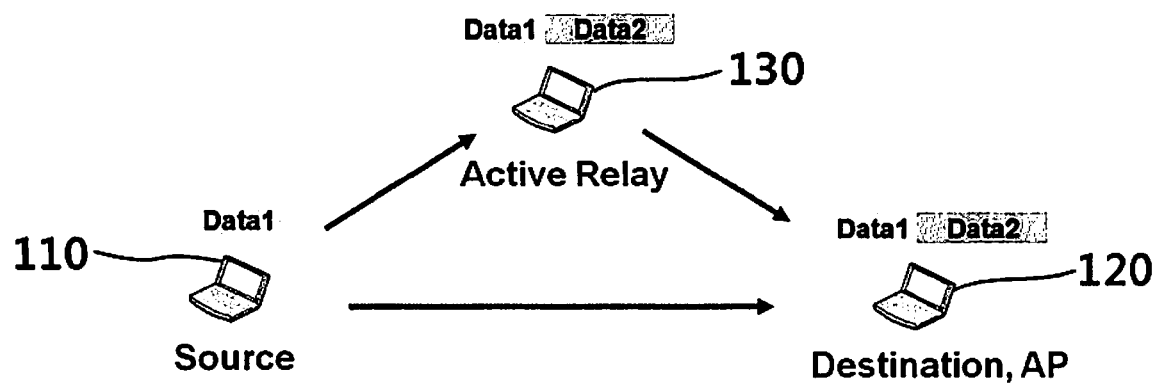
FIG. 2 is a conceptual diagram for explaining a method of performing cooperative communication in a wireless LAN according to an example embodiment of the present invention.

FIG. 2 is a conceptual diagram bar explaining a method of performing cooperative communication in a wireless LAN according to an example embodiment of the present invention.

Referring to FIG. 2, the method of performing cooperative communication in a wireless LAN according to an example embodiment of the present invention is performed by a transmitter (a source; 110) configured to transmit data, a receiver (a destination or an access point; 120) that is a destination of the data transmitted by the transmitter, and a relay 130 configured to receive the data from the transmitter 110 and transmit the data to the receiver 120 between the transmitter 110 and the receiver 120.

In the method of performing cooperative communication according to an example embodiment of the present invention, the receiver 120 determines whether cooperative communication is necessary, and the transmitter 110 selects the relay 130 that will participate in the cooperative communication. The relay 130 attaches its own data Data2 to the data Data1 received from transmitter 110 and transmits resultant data to the receiver 120.

For the cooperative communication described above, a device satisfying a specific condition must serve as the relay. In the example embodiment of the present invention, the device satisfying the specific condition is referred to as an active relay. In the example embodiment of the present invention, MAC protocol for cooperative communication based on the active relay is referred to as active relay-based cooperative MAC (AR-CMAC) protocol.

Figure 3:
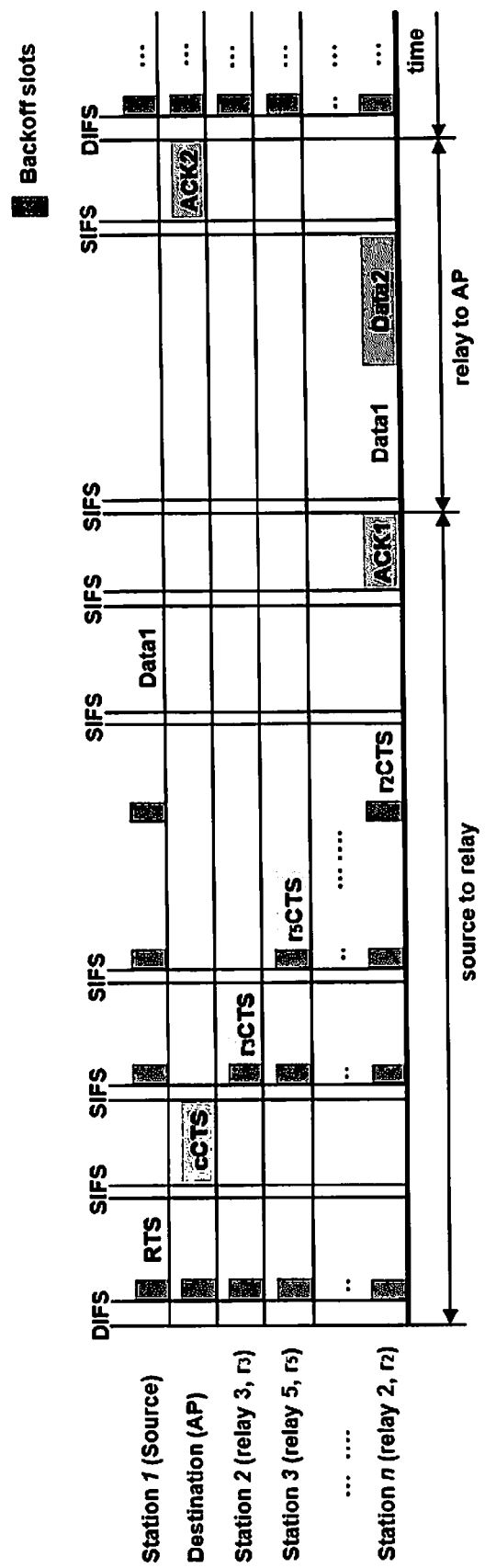
FIG. 3 illustrates a method of performing cooperative communication in a wireless LAN according to an example embodiment of the present invention.

FIG. 3 illustrates a method of performing cooperative communication in a wireless LAN according to an example embodiment of the present invention.

Referring to FIG. 3, first, a transmitter (station 1 or a source) obtains transmission opportunity through backoff contention after a distributed coordination function Inter-Frame space (DIFS), and then transmits a request to send (RTS) frame to a receiver (a destination or an access point (AP)) to reserve a medium.

Upon successful receipt of the RTS frame, the receiver determines whether cooperative communication is necessary based on a transmission rate of the transmitter. When it is determined that cooperative communication is necessary, the receiver responds with a cooperative clear to send (cCTS) frame after a short InterFrame space (SIFS) to request the cooperative communication.

A criterion for determining whether cooperative communication is necessary is a transmission rate of data that the receiver has recently received from the transmitter. That is, when a transmission rate of the transmitter is lower than a maximum transmission rate supported by protocol (e.g., IEEE 802.11a/b/g) used in the transmitter, the receiver determines that cooperative communication is necessary and responds to the transmitter with the cCTS frame instructing the cooperative communication. For the determination, the receiver must hold data transmission rate information of each transmitter that has been recently successfully received. Since a range of available multiple transmission rates differs according to basic protocol used by each transmitter, the maximum transmission rate value, which is the criterion for determining whether cooperative communication is necessary, is set to a different value according to the basic protocol used by each transmitter.

All devices present within the transmission coverage of the receiver may overhear the cCTS frame transmitted by the receiver due to a property of a radio environment. As a result, the devices present within the transmission coverage of the receiver, as well as the transmitter, can recognize, from the cCTS frame, that cooperative communication is necessary.

The transmitter receiving the cCTS frame waits to receive responses from candidate relays that will serve as relays. The candidate relays overhearing the cCTS frame respond to the transmitter with a relay i clear to send (riCTS) frame when desiring to serve as the relay.

The transmitter receives the riCTS frames during a predetermined period of time, selects a best relay based on the received riCTS frames, and transmits its own data Data1 to the selected relay (a station n or relay 2).

Upon receipt of the data from the transmitter, the relay transmits an acknowledgment (ACK) frame to the transmitter to indicate successful receipt of the data from the transmitter, attaches its own data Data 2 to the data Data1 of the transmitter, and transmits resultant data to the receiver.

For the cooperative communication as shown in FIG. 3, new frames supporting the cooperative communication must be defined.

Figure 4:
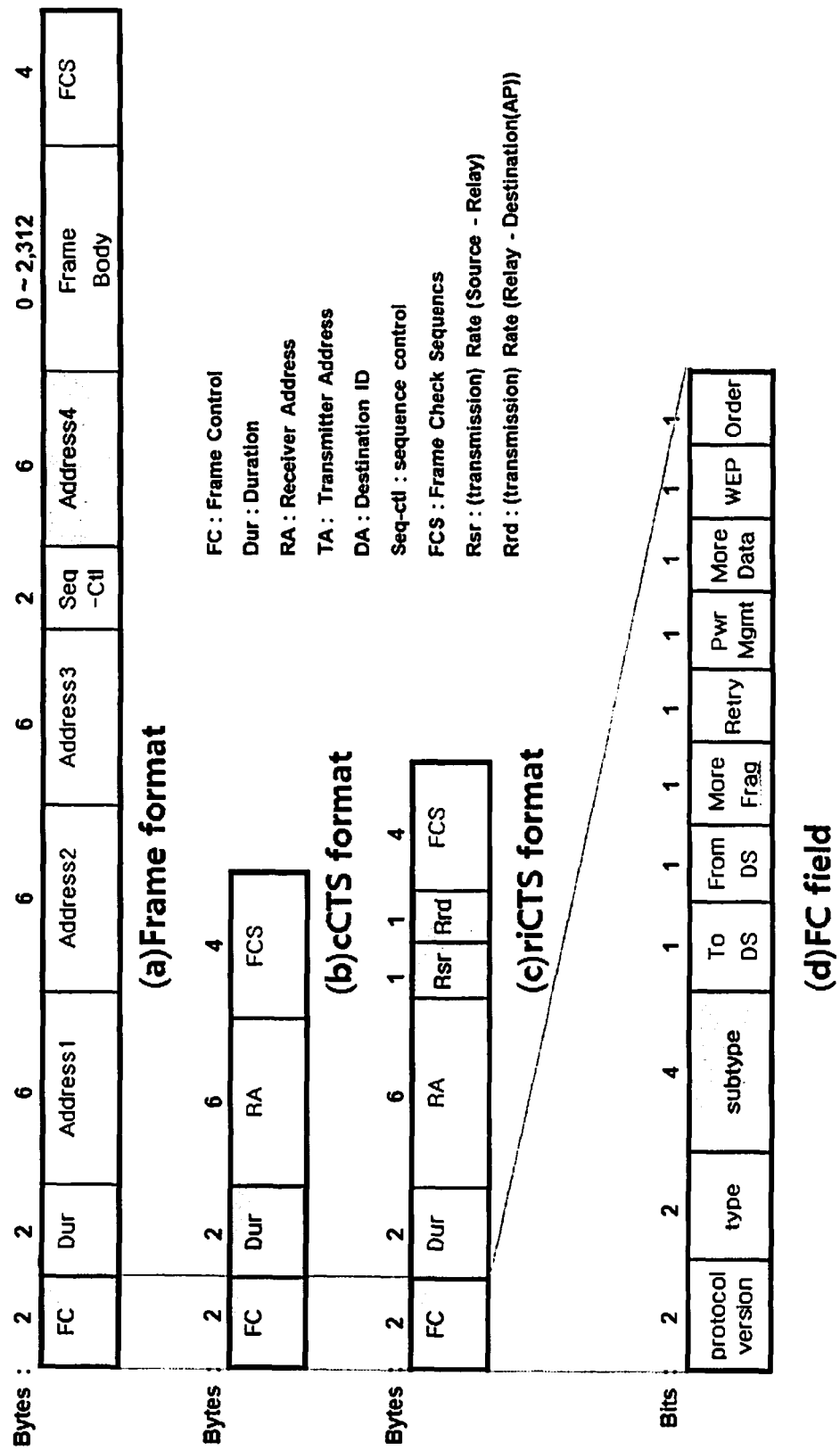
FIG. 4 illustrates structures of frames for supporting the method of performing cooperative communication in a wireless LAN according to an example embodiment of the present invention.

FIG. 4 illustrates structures of frames for supporting the method of performing cooperative communication in a wireless LAN according to an example embodiment of the present invention.

FIG. 4(a) illustrates a structure of a MAC frame transmitted in cooperative communication, and FIG. 4(b) illustrates a role of a conventional CTS frame and a structure of a cCTS frame to request cooperative communication according to an example embodiment of the present invention. FIG. 4(c) illustrates a structure of a riCTS frame with which the relay supporting relaying responds to the transmitter, and FIG. 4(d) illustrates a structure of a frame control (FC) field for differentiating the newly added or changed frames as shown in FIGS. 4(a), (b) and (c) with a MAC frame defined in legacy IEEE 802.11.

In the MAC frame according to an example embodiment of the present invention shown in FIG. 4(a), an address of the relay participating in the cooperative communication is contained in a field "Address 4." As shown in FIG. 4(c), the riCTS frame transmitted by each device desiring to participate in the cooperative communication includes Rsr and Rrd fields. Data transmission rate information between the transmitter and the relay is contained in the Rsr field, and data transmission rate information between the relay and the receiver is contained in the Rrd field. Here, the transmission rate information contained in the Rsr and Rrd fields may be determined by measuring a signal to noise ratio (SNR) value of the RTS frame or the cCTS frame, when the frame is received. Since this determination scheme is well known in the wireless LAN supporting multiple transmission rates through link adaptation, a detailed description of the scheme will be omitted.

As shown in FIG. 4(d), a "Subtype" field contained in the FC field of each frame contains a reserved value defined in the IEEE 802.11 standard to differentiate each frame according to an example embodiment of the present invention with an existing IEEE 802.11 MAC frame. That is, values indicating frames used for cooperative communication are contained in the field "Subtype."

Figure 5:
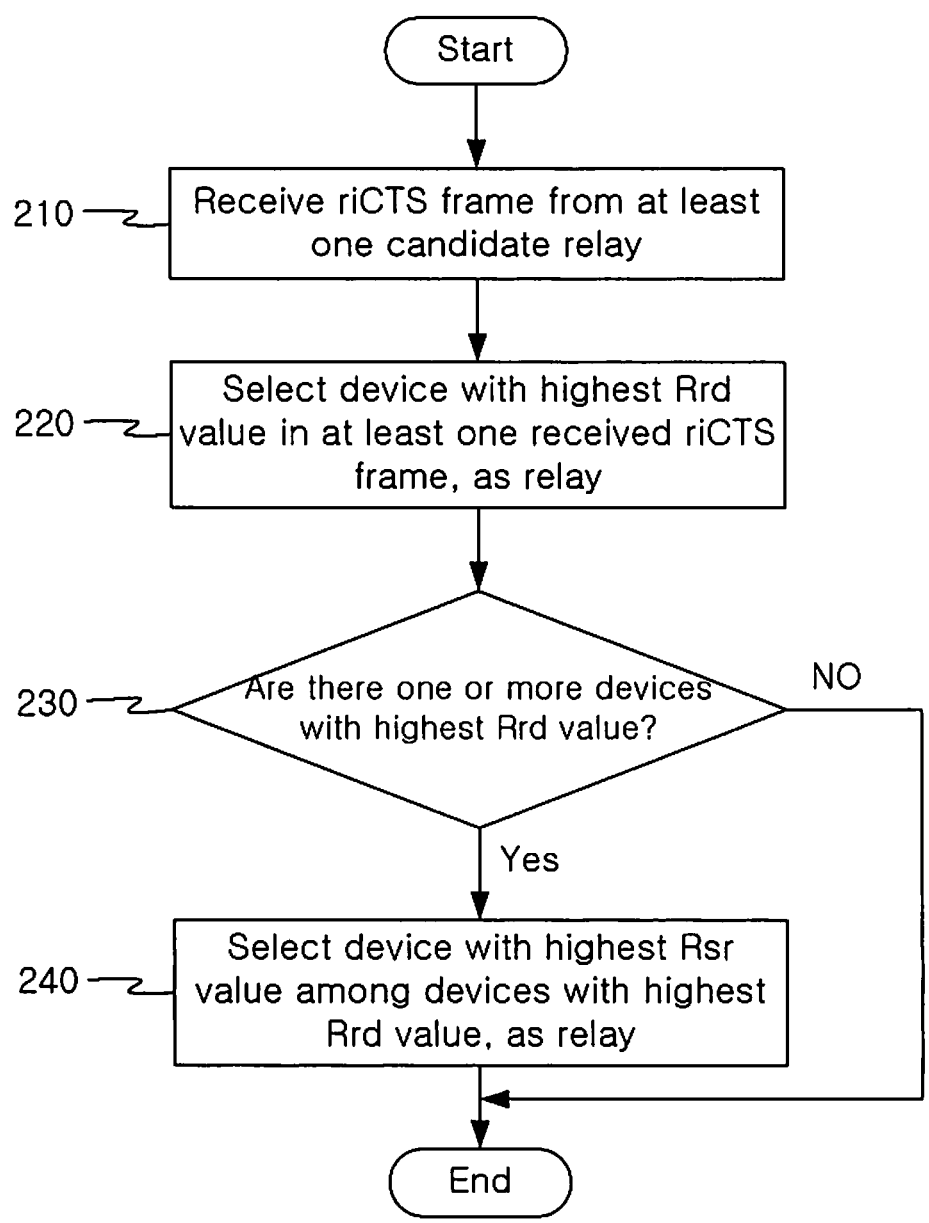
FIG. 5 is a flowchart illustrating a method of selecting a relay in the method of performing cooperative communication in a wireless LAN according to an example embodiment of the present invention.

FIG. 5 is a flowchart illustrating a method of selecting a relay in the method of performing cooperative communication in a wireless LAN according to an example embodiment of the present invention.

Referring to FIG. 5, in the method of selecting a relay according to an example embodiment of the present invention, a transmitter selects the relay based on a riCTS frame received from at least one device.

Specifically, the transmitter receives a riCTS frame from at least one candidate relay (step 210), checks an Rrd field of each received riCTS frame, and selects, as the relay, a candidate relay with the highest Rrd value (step 220).

The transmitter determines whether there are one or more candidate relays with the highest Rrd value (step 230). When it is determined that there are one or more candidate relays with the highest Rrd value, the transmitter checks Rsr fields of the riCTS frames received from the candidate relays with the highest Rrd value, and selects a candidate relay with the highest Rsr value as the relay (step 240).

In the process of selecting the relay shown in FIG. 5, the Rrd and Rsr values contained in the riCTS frame transmitted by the at least one candidate relay should be higher than a data transmission rate when the transmitter transmits data to the receiver directly, not via the relay.

The reason for considering Rrd preferentially to Rsr as a relay selection criterion is that a total amount of data transmitted by the relay is equal to a sum of data Data 1 of the transmitter and data Data 2 of the relay (i.e., Data 1+Data 2), and a transmission rate between the relay and the receiver must be higher then that between the transmitter and the relay to reduce an overall transmission time and increase medium efficiency since an amount of data (Data 1+Data 2) transmitted between the relay and the receiver is greater than an amount of the data Data 1 transmitted between the transmitter and the relay.

Next, in the method of performing cooperative communication in a wireless LAN according to an example embodiment of the present invention, determination of order of transmitting riCTS frames in respective candidate relays is necessary.

In a binary exponential backoff algorithm used in legacy IEEE 802.11 MAC, when collision occurs in a contention window, the contention window exponentially increases so that a colliding device can select a backoff value in the increased contention window and collision probability can be reduced in subsequent transmission.

However, since the process of transmitting the riCTS frames in the method of performing cooperative communication according to an example embodiment of the present invention is added to embody the cooperative communication, use of much time to transmit the riCTS frames causes overhead, which decreases the overall throughput.

Accordingly, the method of performing cooperative communication according to an example embodiment of the present invention allows colliding candidate relays to give up transmitting their riCTS frames, instead of retransmitting the riCTS frames and also allows only non-colliding candidate relays to transmit their riCTS frames in order to decrease the overhead, thereby reducing contention among the candidate relays. That is, all the candidate relays have transmission order determined based on a backoff value selected in any contention window in which the cCTS frames are transmitted, and have only one transmission opportunity during a determined period. This is because basic cooperative communication can be performed only if one relay is provided.

In general, in IEEE 802.11, an initial contention window used for RTS contention is [0, 31] for a direct sequence spread spectrum (DSSS) scheme. However, in the cooperative communication according to an example embodiment of the present invention, in order to reduce the overhead, when there are 1 to 40 devices in a basic service set (BSS) network, a contention window for riCTS frame transmission is [0, 7], and when there are more than 40 devices, the contention window is [0, 15]. A larger contention window is available according to the number of the devices. However, in an environment such as a wireless LAN, it is practically difficult to cover 40 or more devices in one BSS network.

In the cooperative communication in a wireless LAN according to an example embodiment of the present invention, the transmitter must accurately recognize a point in time when at least one candidate relay completes transmission of the riCTS frame, to prevent collision from occurring between the data frame of the transmitter and the riCTS frame of the candidate relay.

In the cooperative communication according to an example embodiment of the present invention, the transmitter selects a maximum backoff value from values in the contention window when simultaneously performing a backoff operation with the candidate relay after receiving the cCTS frame from the receiver, in order to prevent the above-described collision.

When the backoff value reaches 0 through the backoff operation, the transmitter determines that the candidate relays have completed transmitting their riCTS frames, selects a best relay based on the above-described criterion using the received riCTS frames, and transmits its own data to the selected relay to request relaying. Thus, cooperative communication is achieved.

In the present invention, the method of performing cooperative communication described above is referred to as AR-CMAC basic.

As described above, in the method of performing cooperative communication according to an example embodiment of the present invention, the riCTS frames transmitted by a number of candidate relays act as the overhead in view of overall network performance, and a maximum transmission number of the riCTS frames is equal to a maximum backoff value selectable in the contention window for riCTS frame transmission plus 1. For example, when the contention window is [0, 7], a total of eight transmissions of the riCTS frame are possible. However, since the IEEE 802.11 standard defines that a control frame is transmitted at a minimum transmission rate, transmission of the riCTS frame by maximum backoff value plus 1 acts as great overhead. When a best relay is already involved in transmitting the riCTS frame several times, subsequently transmitted riCTS frames are meaningless. Accordingly, there is a need for a method of reducing overhead more efficiently.

Figure 6:
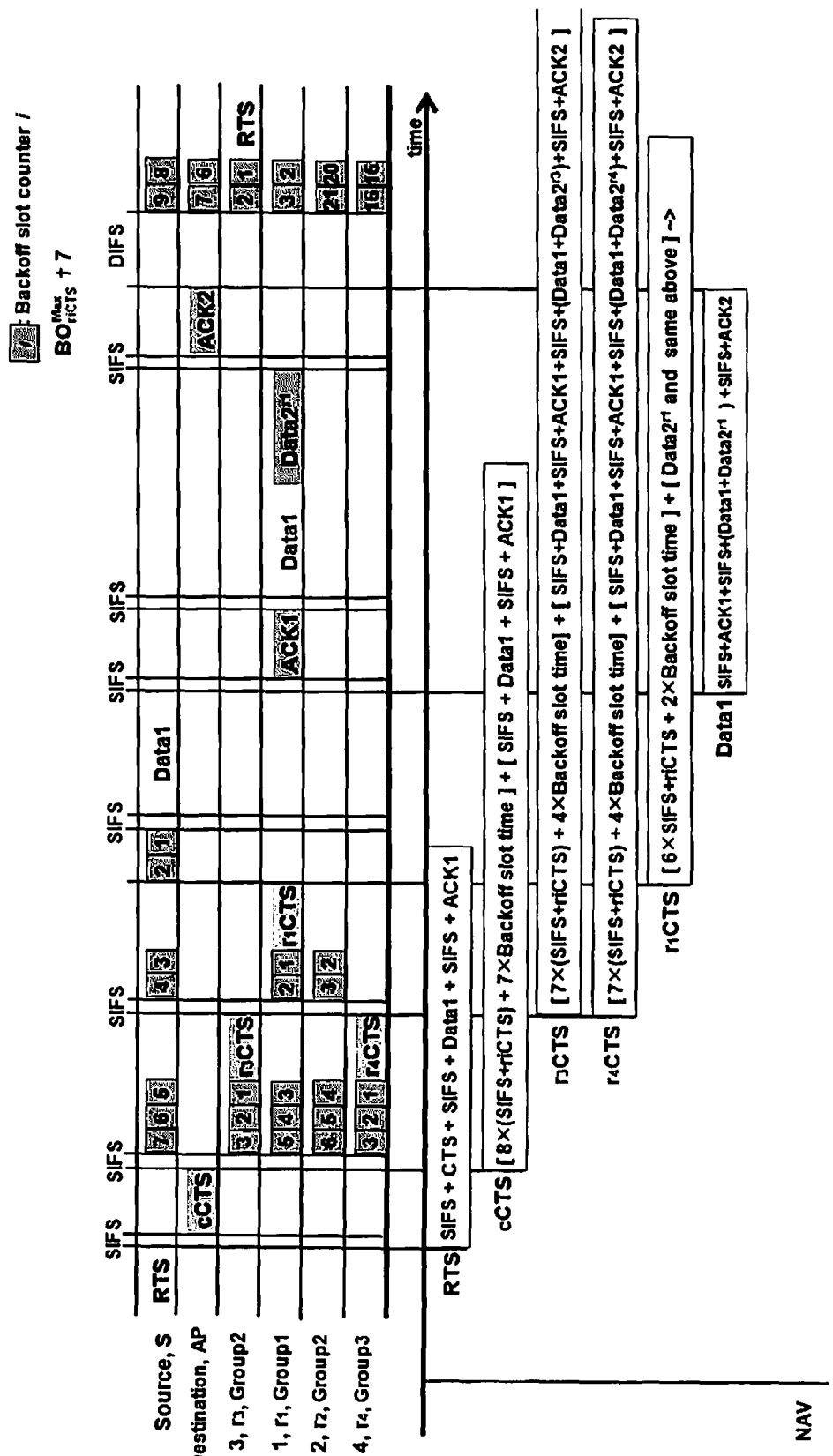
FIG. 6 illustrates a method of performing cooperative communication in a wireless LAN according to another example embodiment of the present invention.
Figure 7:
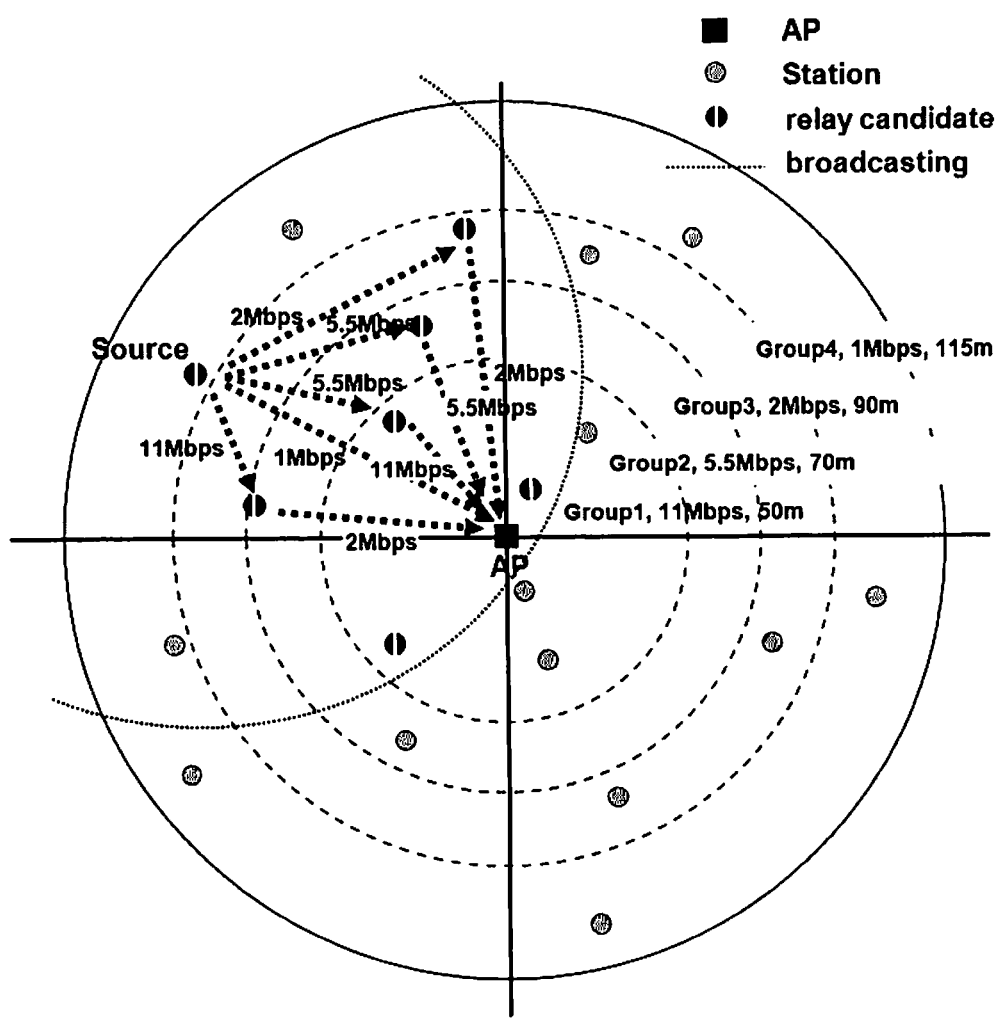
FIG. 7 illustrates a multi-rate transmission network model divided into four groups, supported by IEEE 802.11b, according to a channel condition of each device.

FIG. 6 illustrates a method of performing cooperative communication in a wireless LAN according to another example embodiment of the present invention. FIG. 7 illustrates a multi-rate transmission network model divided into four groups, supported by IEEE 802.11b, according to a channel condition of each device. Hereinafter, the method of performing cooperative communication according to another example embodiment of the present invention shown in FIG. 6 is referred to as AR-CMAC extension.

Referring to FIGS. 6 and 7, in the method of performing cooperative communication in a wireless LAN according to another example embodiment of the present invention, each candidate relay overhears riCTS frames transmitted by other candidate relays, compares conditions of the other candidate relays with its own condition, and gives up transmitting its own riCTS frame when the condition of the other candidate relay transmitting the overheard riCTS frames is superior to its own condition, unlike the method of performing cooperative communication according to an example embodiment of the present invention shown in FIG. 3. Here, each candidate relay compares an Rrd value contained in the overheard riCTS frame with its own Rrd value, and gives up transmitting its own riCTS frame when the Rrd value contained in the overheard riCTS frame is greater than its own Rrd value.

In the method of performing cooperative communication in a wireless LAN according to another example embodiment of the present invention shown in FIG. 6, it was assumed that a maximum backoff value for riCTS frame transmission is set to 7, and the transmitter (i.e., a source) selects the greatest backoff value, 7.

Also, a third candidate relay (relay 3) and a fourth candidate relay (relay 4) among the candidate relays select the same backoff value, which causes collision. However, since the third and fourth candidate relays are allowed to perform only one transmission, they do not participate in subsequent contentions. (That is, the third and fourth candidate relays do not perform the backoff operation.)

When it is assumed that a first relay (relay 1) successfully transmits its own $r_1$CTS frame and the first relay (relay 1) is capable of transmission at a maximum transmission rate between the relay and the receiver because the first relay belongs to group 1 (11 Mbps) (see FIG. 7), the second relay (relay 2) overhearing the $r_1$CTS frame transmitted by the first relay gives up transmitting its own r2CTS frame and stops the backoff operation because the second relay belongs to group 2 (5.5 Mbps).

That is, in the method of performing cooperative communication according to another example embodiment of the present invention shown in FIG. 6, since a $r_1$CTS frame containing the highest Rrd value was transmitted, candidate relays having a riCTS frame to be transmitted among the candidate relays overhearing the $r_1$CTS frame give up transmitting their own riCTS frames, and the transmitter transmits a data frame after performing a remaining backoff operation, thereby efficiently reducing overhead caused by the candidate relays transmitting the riCTS frames.

Values updated to set a network allocation vector (NAV) for preventing frame collision from occurring among devices in the cooperative communication are shown in FIG. 6.

In the method of performing cooperative communication in a wireless LAN according to an example embodiment of the present invention, a fragmentation scheme is used to obtain excellent performance.

A relay participating in the cooperative communication relays the data of the transmitter by attaching its own data to the data of the transmitter and transmitting resultant data to the receiver. Thus, the relay must basically relay a data amount of the transmitter to the receiver. However, a data amount of the relay to be attached may be limited due to an excessive amount of data of the transmitter. This is because a maximum data amount (i.e., a maximum MAC service data unit (MSDU) size) that can be transmitted once on a link layer is limited.

In the example embodiment of the present invention, in order to properly utilize transmission opportunity obtained as a reward for relaying, a fragmentation scheme is used so that the relay can transmit its own data even when the data amount exceeds the maximum data amount.

The fragmentations are limited to a prescribed number (e.g., twice) or a sum of a data amount of the transmitter and a data amount of the relay is limited to a predetermined size (e.g., once transmittable maximum data amount (maximum MSDU size) $\iota\lambda$ 2) so that a medium access time provided to the relay is not too long due to an excessive amount of data, and the fragmentation scheme is applied.

In cooperative communication according to an example embodiment of the present invention as described above, unconditionally performing the cooperative communication does not lead to improved performance of an overall network since overhead may result from riCTS frames transmitted by the candidate relays. Accordingly, there is a need for a criterion for determining whether cooperative communication is necessary.

Figure 8:
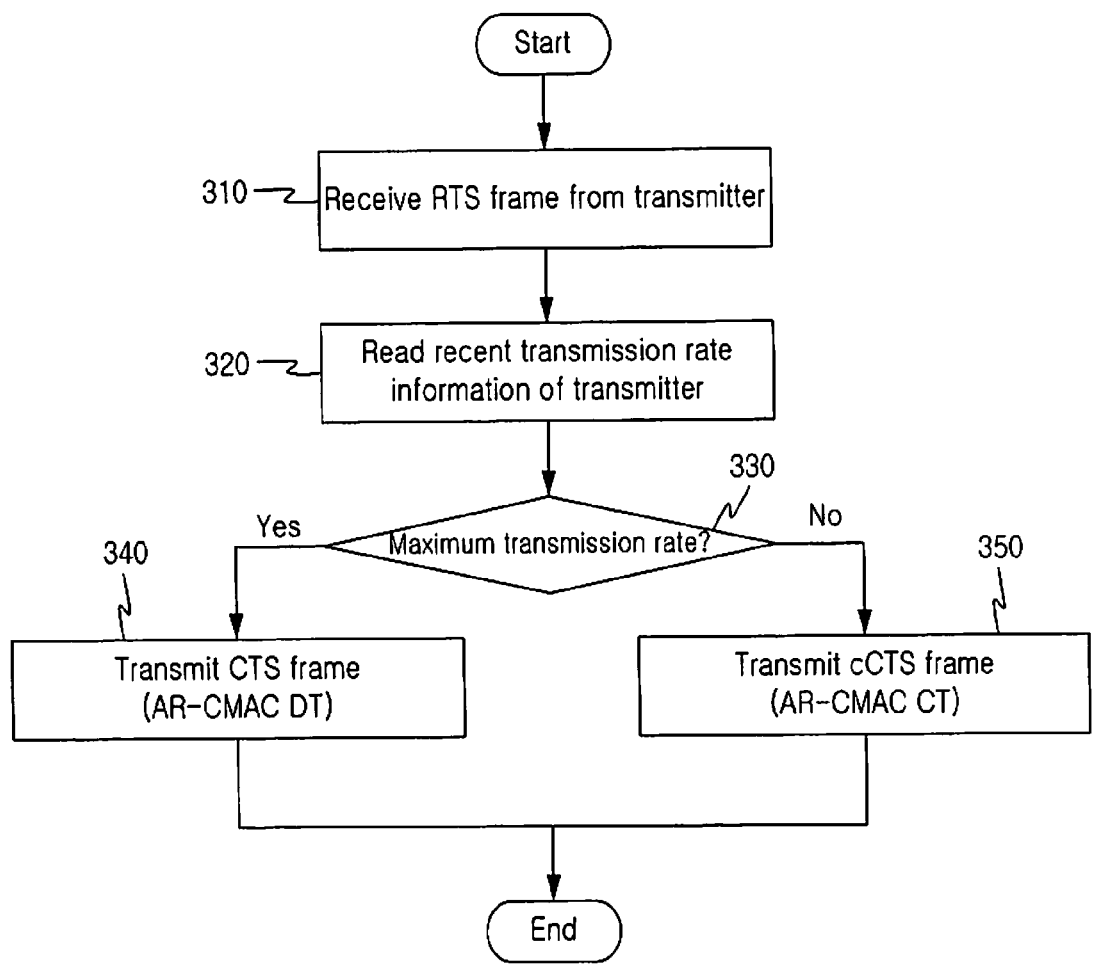
FIG. 8 is a flowchart illustrating a method of determining whether cooperative communication is necessary according to an example embodiment of the present invention.

FIG. 8 is a flowchart illustrating a method of determining whether cooperative communication is necessary according to an example embodiment of the present invention. The method may be performed by a receiver (or, an AP).

Hereinafter, a legacy IEEE 802.11 MAC protocol-based transmission mode is referred to as an AR-CMAC direct transmission (DT) mode (see FIG. 1), and the cooperative communication mode according to an example embodiment of the present invention is referred to as an AR-CMAC cooperative transmission (CT) mode.

Referring to FIG. 8, a receiver (e.g., an AP) receives a RTS frame from a transmitter (step 310), and reads recent transmission rate information of the transmitter using information on the transmitter contained in the received RTS frame (step 320). Here, the receiver manages transmission rate information of each transmitter, and updates the transmission rate information each time the transmitter performs transmission.

The receiver compares the read information with a maximum transmission rate of the transmitter and determines whether the transmitter performs transmission at a maximum transmission rate (step 330). When the transmitter performs transmission at a maximum transmission rate, the receiver determines that cooperative communication is unnecessary and transmits a CTS frame indicating an AR-CMAC DT mode in response to the RTS frame from the transmitter (step 340).

On the other hand, when it is determined in step 330 that the transmission rate of the transmitter is not a maximum transmission rate, the receiver determines that cooperative communication is necessary and transmits a cCTS frame indicating an AR-CMAC CT mode in response to the RTS frame from the transmitter (step 350).

Operation of the AR-CMAC DT mode is the same as that of legacy IEEE 802.11 MAC protocol. That is, the AR-CMAC DT mode conforms to the operational process illustrated in FIG. 1, only when cooperative communication is unnecessary. The cooperative communication is unnecessary when an available transmission rate between the transmitter and the receiver is the maximum transmission rate. It is advantageous to network performance for a transmitter capable of transmission at a maximum transmission rate without the help of a relay to perform direct transmission because the direct transmission requires no additional procedure, such as exchange of a riCTS frame.

When a transmitter that could not use the maximum transmission rate becomes able to use the maximum transmission rate due to a change of a channel environment resulting from a movement of the device, the transmitter selects a relay using the above-described method as the receiver (e.g., an AP) responds with a cCTS frame based on existing device information, such that a suitable relay is not selected, and the transmitter determines a suitable transmission rate based on the SNR value of the cCTS frame and uses direct transmission when a maximum transmission rate is available.

When the transmitter successfully performs the direct transmission based on its own determination as described above, the transmission rate information of the transmitter managed by the receiver is updated. Accordingly, the receiver responds with the CTS frame indicating an AR-CMAC DT mode in a subsequent transmission process.

On the other hand, when the maximum transmission rate becomes unavailable to the transmitter, the transmission is successfully performed at a low transmission rate through a link adaptation process and, thereafter, cooperative communication is performed by the receiver responding with the cCTS frame.

As a result, in the method of performing cooperative communication in a wireless LAN according to an example embodiment of the present invention, when transmission can be performed at a maximum transmission rate between the transmitter and the receiver, the direct transmission is performed without the help of the relay, and when transmission cannot be performed at a maximum transmission rate between the transmitter and the receiver, the cooperative communication is performed with the help of the relay, thereby increasing medium efficiency and improving overall network throughput.

Hereinafter, a result of evaluating the performance of the method of performing cooperative communication in a wireless LAN according to an example embodiment of the present invention will be described.

Figure 10:
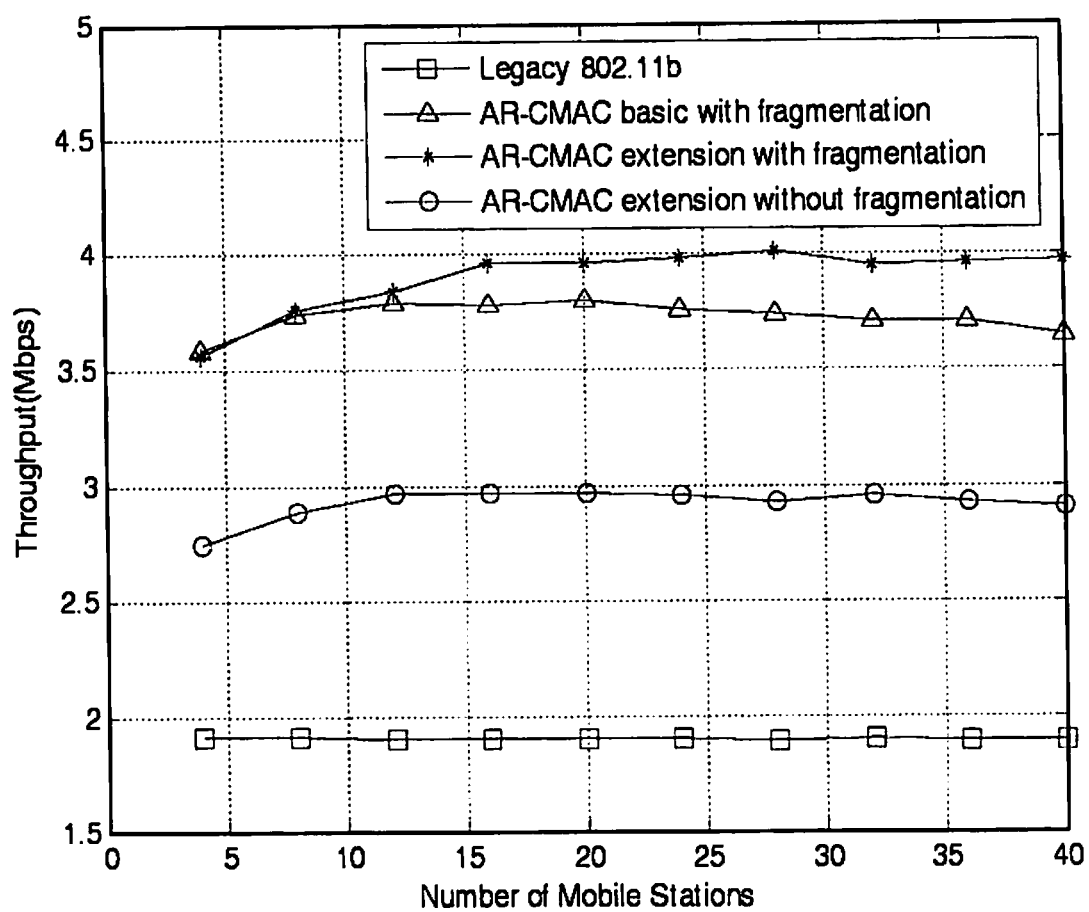
FIG. 10 illustrates a result of comparing the throughput of the method of performing cooperative communication in a wireless LAN according to an example embodiment of the present invention with that of legacy IEEE 802.11b.

FIG. 9 illustrates dominant parameter values used to evaluate the performance of the method of performing cooperative communication in a wireless LAN according to an example embodiment of the present invention. FIG. 10 illustrates a result of comparing the throughput of the method of performing cooperative communication in a wireless LAN according to an example embodiment of the present invention with that of legacy IEEE 802.11b.

In the example embodiment of the present invention, an IEEE 802.11b high rate-direct sequence spread spectrum (HR-DSSS) among the IEEE 802.11 series supporting multiple transmission rates was used as a performance evaluation model.

It can be seen from FIG. 10 that as a result of evaluating the performance, all the AR-MACs according to an example embodiment of the present invention exhibit a higher performance than legacy IEEE 802.11b, AR-CMACs with fragmentation (e.g., AR-CMAC basic with fragmentation and AR-CMAC extension with fragmentation) exhibit a higher performance than AR-CMACs without fragmentation (e.g., AR-CMAC extension without fragmentation), and giving up riCTS transmission (AR-CMAC extension with fragmentation) minimizes effects of overhead even when the number of devices in the network increases, thereby preventing performance degradation.

Figure 11:
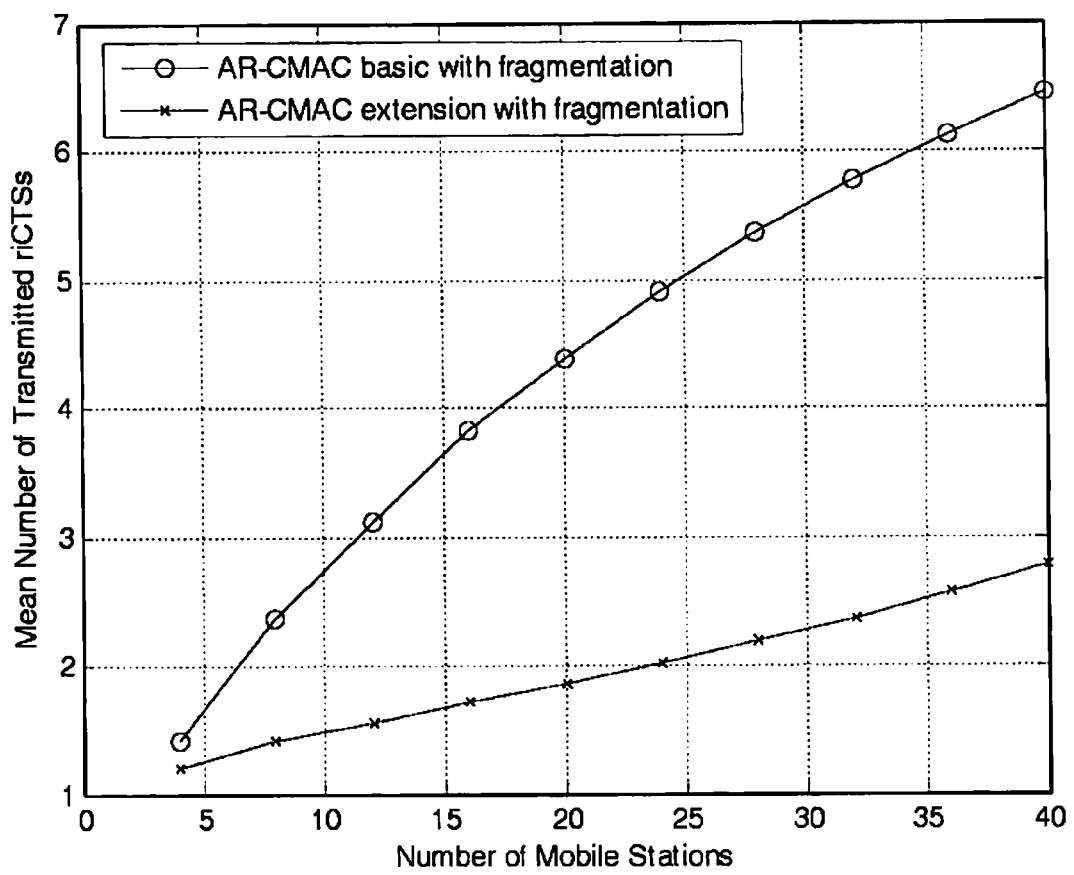
FIG. 11 illustrates a graph showing an effect of giving-up transmitting a riCTS frame in the method of performing cooperative communication in a wireless LAN according to an example embodiment of the present invention.

FIG. 11 illustrates a graph showing an effect of giving-up transmitting a riCTS frame in the method of performing cooperative communication in a wireless LAN according to an example embodiment of the present invention.

It can be seen from FIG. 11 that when transmitting the riCTS frame is not given up (e.g., AR-CMAC basic with fragmentation), the number of transmitted riCTS frames rapidly increases as the number of devices increases, while when transmitting the riCTS frame is given up (e.g., the AR-CMAC extension with fragmentation), the number of transmitted riCTS frames slowly increases as the number of devices increases.

That is, it can be seen from FIG. 11 that even when there are a number of candidate relays due to a number of devices distributed in the wireless LAN, the transmitter can select a suitable active relay as the transmitter receives a smaller number of the riCTS frames from the candidate relay devices by the candidate relay devices giving up transmitting the riCTS frames.

As described above, according to the method of performing cooperative communication in a wireless LAN, when it is determined that the transmission rate of the transmitter is not a maximum transmission rate, based on a recent transmission rate of the transmitter, the receiver transmits the cCTS frame instructing cooperative communication, and the candidate relays overhearing the cCTS frame transmit the riCTS frame for supporting relaying to the transmitter. Here, to reduce overhead, the candidate relays transmit the riCTS frame only once during a determined period, overhear the riCTS frames transmitted by other candidate relays, and give up transmitting their riCTS frames when a condition of the other candidate relays is superior to its own condition. The transmitter selects, as a relay, a candidate relay with the highest transmission rate based on the transmission rate between the relay and the receiver included in the riCTS frames transmitted by a plurality of candidate relays and transmits data to the selected relay, and the relay attaches its own data to the data of the transmitter and transmits resultant data to the receiver. Here, the relay transmits the data through fragmentation within a prescribed number or within a prescribed data amount.

Thus, an average transmission rate of the wireless LAN can be improved with minimized overhead, and additional transmission opportunity can be provided to a relaying device, thereby properly rewarding the relaying device.

While the example embodiments of the present invention and their advantages have been described in detail, it should be understood that various changes, substitutions and alterations may be made herein without departing from the scope of the invention.

What is claimed is:

1. A method of performing cooperative communication in a wireless local area network (LAN), the method comprising: receiving, by a receiver, a transmission request signal; determining, by the receiver, whether cooperative communication is necessary based on the received transmission request signal; when it is determined that the cooperative communication is necessary, transmitting, by the receiver, a transmission response signal instructing the cooperative communication; monitoring, by at least one device, the transmission response signal instructing the cooperative communication; transmitting, by the at least one device, a response signal for supporting relaying to a transmitter; selecting, by the transmitter, a relay from the at least one device based on the response signal for supporting relaying received from the at least one device; and transmitting, by the transmitter, data to the selected relay, wherein the determining, by the receiver, whether cooperative communication is necessary includes, reading a newest transmission rate information of the transmitter transmitting the transmission request signal, determining whether the transmitter performs transmission at a maximum transmission rate based on the read newest transmission rate information, and when it is determined that the transmitter does not perform transmission at the maximum transmission rate, determining whether the cooperative communication is necessary, and wherein the response signal for supporting relaying includes first transmission rate information that is transmission rate information between the transmitter and the at least one device, and second transmission rate information that is transmission rate information between the at least one device and a receiver transmitting the transmission response signal instructing cooperative communication.

2. The method of claim 1, wherein the determining, by the receiver, whether cooperative communication is necessary further includes: when it is determined that the transmitter performs transmission at the maximum transmission rate, determining that the cooperative communication is unnecessary and transmitting a transmission response signal instructing direct communication.

3. The method of claim 1, wherein the transmission response signal instructing the cooperative communication includes a field including a value instructing the cooperative communication.

4. The method of claim 1, wherein the selecting a relay comprises: selecting, as the relay, a device with a highest second transmission rate information among the second transmission rate information included in the response signal for supporting relaying.

5. The method of claim 1, wherein the selecting a relay comprises: when there are two or more devices with a highest second transmission rate information, selecting a device with a highest first transmission rate among the two or more devices, as the relay.

6. The method of claim 1, further comprising: receiving, by the selected relay, the data from the transmitter; and attaching, by the relay, data of the relay to the data received from the transmitter and transmitting resultant data to the receiver.

7. The method of claim 1, wherein the transmitting data to the selected relay comprises: selecting, by the transmitter, a maximum backoff value in a prescribed contention window for data transmission; and when the selected maximum backoff value is 0, transmitting the data.

8. The method of claim 6, wherein the transmitting resultant data to the receiver comprises: transmitting, by the relay, the data received from the transmitter and the data of the relay to the receiver through fragmentation within a prescribed number.

9. A method of performing data transmission in a wireless LAN, the method comprising: transmitting, by a transmitter, a transmission request signal to a receiver to request data transmission; receiving, by the transmitter, a transmission response signal instructing cooperative communication as a response to the transmission request signal from a receiver; receiving, by the transmitter, a response signal for supporting relaying from at least one candidate relay; selecting, by the transmitter, a relay based on the response signal for supporting relaying; and transmitting, by the transmitter, data to the selected relay, wherein the selecting a relay includes, selecting, as the relay, a candidate relay with a highest second transmission rate information among first transmission rate information and second transmission rate information included in the response signal for supporting relaying, the first transmission rate information being a transmission rate between the candidate relay and the transmitter, and the second transmission rate information being a transmission rate between the candidate relay and the receiver, and when there are two or more candidate relays with the highest second transmission rate among the first transmission rate information and the second transmission rate information included in the response signal for supporting relaying, selecting a candidate relay with a highest first transmission rate information among the two or more candidate relays as the relay.

10. The method of claim 9, wherein the transmitting data to the selected relay comprises: selecting a maximum backoff value in a prescribed contention window for data transmission; and when the selected maximum backoff value is 0, transmitting the data.

11. A method of performing cooperative communication in a wireless LAN, the method comprising: monitoring, by a first device, a transmission response signal instructing cooperative communication; selecting, by the first device, a backoff value for transmitting a response signal for supporting relaying; and transmitting only once, by the first device, the response signal for supporting relaying based on the selected backoff value; receiving, by the first device, first data from the transmitter; attaching, by the first device, second data of the first device to the first data; and transmitting, by the first device, the first data and the second data to a receiver, wherein the response signal, transmitted by the first device, for supporting relaying includes, first transmission rate information that is transmission rate information between a transmitter and the first device; and second transmission rate information that is transmission rate information between the first device and a receiver.

12. The method of claim 11, further comprising: monitoring, by a second device, the response signal for supporting relaying that is transmitted by the first device; comparing, by the second device, the second transmission rate information of the first device with the second transmission rate information of the second device; and when the second transmission rate of the second device is lower than the second transmission rate of the first device, not transmitting a response signal for supporting relaying.

13. The method of claim 11, wherein the transmitting the first data and the second data to a receiver comprises:
transmitting, by the first device, the first data and the second data to the receiver through fragmentation within a prescribed number.

14. The method of claim 11, wherein the transmitting the first data and the second data to a receiver comprises: transmitting, by the first device, the first data and the second data to the receiver through fragmentation within a prescribed range of data amount.

15. A method of performing cooperative communication in a wireless LAN, the method comprising: determining, by a receiver, whether cooperative communication is necessary based on a transmission request signal provided from a transmitter; when it is determined that the cooperative communication is necessary, transmitting, by the receiver, a transmission response signal instructing the cooperative communication; monitoring, by a plurality of devices, the transmission response signal instructing the cooperative communication; transmitting, by at least one of the plurality of devices, a response signal for supporting relaying to the transmitter; selecting, by a transmitter, a relay based on the response signal; transmitting, by the transmitter, data to the relay; and attaching, by the relay, data of the relay to the data transmitted by the transmitter and transmitting result data to the receiver, wherein the response signal for supporting relaying transmitted by the at least one device includes first transmission rate information and second transmission rate information, the first transmission rate information being transmission rate information between the transmitter and the at least one device, and the second transmission rate information being transmission rate information between the at least one device and the receiver, wherein the transmitting a response signal for supporting relaying includes transmitting a resultant signal to the transmitter, and wherein the selecting a relay based on the response signal for supporting relaying includes, selecting, as the relay, a device with a highest second transmission rate information among the second transmission rate information included in the response signal for supporting relaying; and when there are two or more devices with the highest second transmission rate information, selecting, as the relay, a device with a highest first transmission rate information among the two or more devices.

16. The method of claim 15, wherein the determining whether cooperative communication is necessary comprises: reading, by the receiver, a newest transmission rate information of the transmitter; determining, by the receiver, whether the transmitter performs transmission at a maximum transmission rate based on the read newest transmission rate information; and when it is determined that the transmitter does not perform transmission at the maximum transmission rate, determining whether the cooperative communication is necessary.

* * * * *